(12) United States Patent
Son (10) Patent No.: US 9,052,545 B2
(45) Date of Patent: Jun. 9, 2015

(54) LIQUID CRYSTAL DISPLAY DEVICE

(75) Inventor: Young-Uk Son, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 13 days.

(21) Appl. No.: 13/427,795

(22) Filed: Mar. 22, 2012

(65) Prior Publication Data

US 2013/0141667 A1    Jun. 6, 2013

(30) Foreign Application Priority Data

Dec. 6, 2011    (KR) .................. 10-2011-0129681

(51) Int. Cl.
*G02F 1/1345*    (2006.01)
*G02F 1/1335*    (2006.01)
*F21V 8/00*    (2006.01)

(52) U.S. Cl.
CPC ........ *G02F 1/133615* (2013.01); *G02B 6/0083* (2013.01); *G02B 6/0085* (2013.01)

(58) Field of Classification Search
CPC ................................................ G02F 1/133615
USPC .......................................................... 349/150
See application file for complete search history.

(56) References Cited

U.S. PATENT DOCUMENTS

| | | | | |
|---|---|---|---|---|
| 2008/0074902 | A1* | 3/2008 | Oh et al. ................. | 362/612 |
| 2008/0266905 | A1* | 10/2008 | Yeh ........................ | 362/630 |
| 2010/0007817 | A1 | 1/2010 | Kim | |
| 2010/0110327 | A1* | 5/2010 | Kim et al. .............. | 349/58 |
| 2010/0165657 | A1* | 7/2010 | Lee et al. ............... | 362/602 |
| 2010/0194771 | A1* | 8/2010 | Harayama et al. ..... | 345/589 |
| 2010/0220496 | A1* | 9/2010 | Kim ........................ | 362/606 |
| 2010/0328947 | A1* | 12/2010 | Chang et al. ........... | 362/249.02 |
| 2011/0122339 | A1* | 5/2011 | Hamada .................. | 349/62 |
| 2011/0134161 | A1 | 6/2011 | Son et al. | |
| 2011/0134371 | A1* | 6/2011 | Shimojoh et al. ...... | 349/65 |
| 2011/0232953 | A1* | 9/2011 | Oga et al. .............. | 174/258 |
| 2011/0247862 | A1* | 10/2011 | Low ........................ | 174/254 |

FOREIGN PATENT DOCUMENTS

| | | |
|---|---|---|
| CN | 101625464 A | 1/2010 |
| CN | 101625480 A | 1/2010 |
| CN | 101988995 A | 3/2011 |
| CN | 102088818 A | 6/2011 |
| TW | 201100711 A1 | 1/2011 |

OTHER PUBLICATIONS

State Intellectual Property Office of the People's Republic of China, First Office Action, Chinese Patent Application No. 201210424759.3, Dec. 22, 2014, nineteen pages.

* cited by examiner

*Primary Examiner* — Bumsuk Won
*Assistant Examiner* — Edmond Lau
(74) *Attorney, Agent, or Firm* — Fenwick & West LLP (57) ABSTRACT

A liquid crystal display device includes a reflection plate; a light guide plate over the reflection plate; a light-emitting diode (LED) assembly including LEDs arranged along a side surface of the light guide plate, an LED flexible printed circuit board (FPCB) having LEDs mounted on its surface. The FPCB includes a bar and a leg portion extending from the body. The bar and the leg portion are integrated into a single body. The leg portion extends from the bar to a circuit for controlling the LEDs. A metallic bar is attached to bar of the LED FPCB to provide rigidity to the FPCB as well as cool the FPCB.

17 Claims, 6 Drawing Sheets

LIQUID CRYSTAL DISPLAY DEVICE

RELATED APPLICATIONS

This application claims priority to Korean Patent Application No. 10-2011-0129681, filed on Dec. 6, 2011, which is hereby incorporated by reference.

BACKGROUND

1. Field of The Disclosure

This disclosure relates to a liquid crystal display device, and more particularly, to a connection structure between a flexible cable and a light-emitting diode (LED) assembly functioning as a light source in a liquid crystal display device.

2. Discussion of The Related Art

Liquid crystal display (LCD) devices are widely used as monitors of notebook computers, monitors of personal computers and televisions due to excellent reproduction of moving images and high contrast ratio. LCD devices use the optical anisotropy and polarization properties of liquid crystal molecules of a liquid crystal layer to produce an image.

An LCD device includes two substrates spaced apart from each other and facing each other as well as a liquid crystal layer interposed between the two substrates. The alignment direction of the liquid crystal molecules is controlled by varying the intensity of an electric field applied to the liquid crystal layer, and changing the transmittance of light through the liquid crystal layer.

Figure 1:
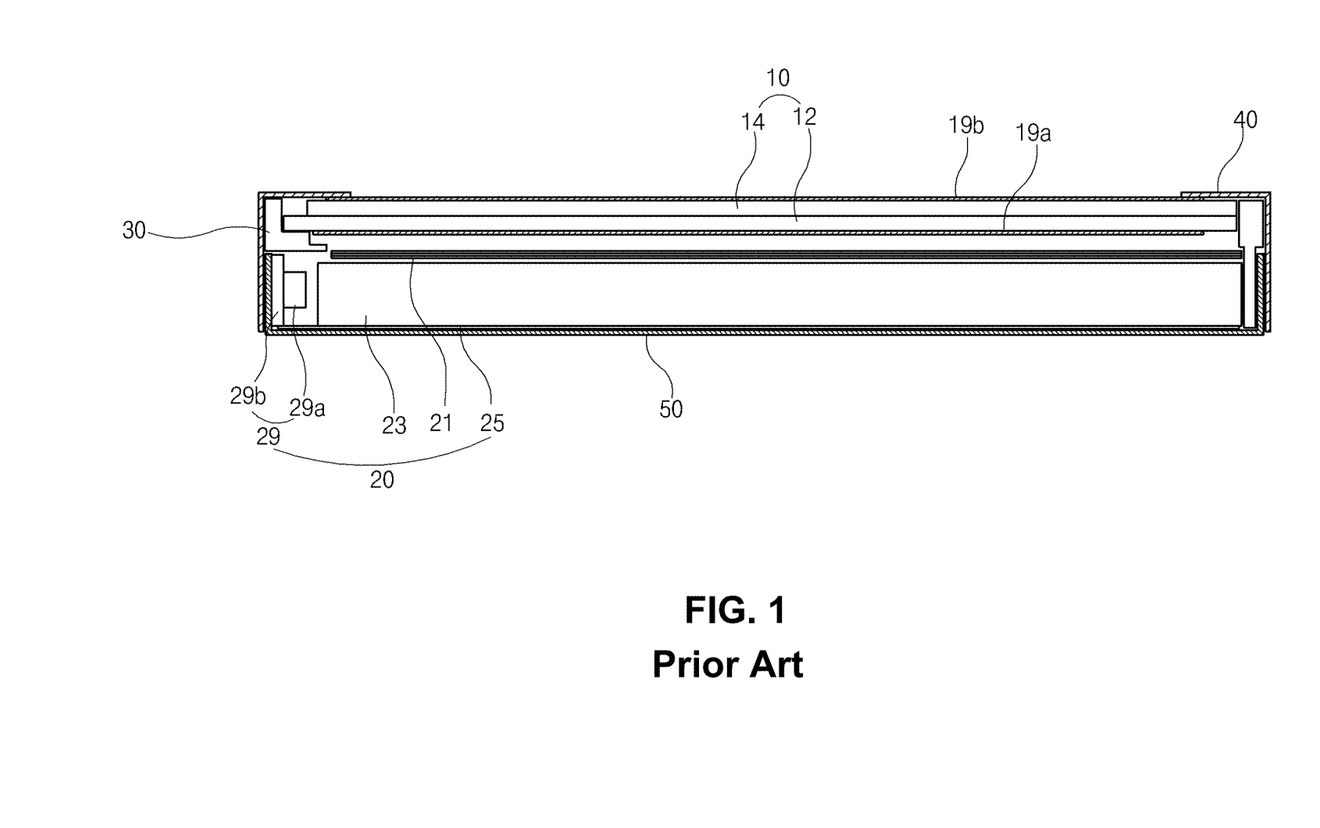
FIG. 1 is a cross-sectional view illustrating a conventional liquid crystal display (LCD) device including light emitting diodes (LEDs) as light sources.

The LCD devices require an additional light source because the LCD devices are not self-luminescent. Therefore, a backlight unit is disposed at a rear side of a liquid crystal (LC) panel and emits light into the LC panel to display images. Figure (FIG. 1 is a cross-sectional view of a conventional liquid crystal display (LCD) device including LEDs as a light source. The LCD device of FIG. 1 includes a liquid crystal panel 10, a backlight unit 20, a support frame 30, a top cover 40 and a bottom cover 50. The liquid crystal panel 10 displays images and includes first and second substrates 12 and 14 facing and attached to each other with a liquid crystal layer (not shown) placed therebetween.

The backlight unit 20 is disposed at a rear side of the liquid crystal panel 10. The backlight unit 20 includes a light source, a reflection plate 25, a light guide plate 23 and a plurality of optical sheets 21. The light source is disposed at an edge of at least one side of the support frame 30 along a length direction. The reflection plate 25 is disposed over the bottom cover 50 and is colored in white or silver. The light guide plate 23 is disposed over the reflection plate 25. The plurality of optical sheets 21 are disposed over the light guide plate 23.

Edges of the liquid crystal panel 10 and the backlight unit 20 are surrounded by the support frame 30 having a rectangular shape. The top cover 40 covers edges of the front surface of the liquid crystal panel 10, and the bottom cover 50 covers a rear surface of the backlight unit 20. The top cover 40 and the bottom cover 50 are combined with the support frame 30 to thereby constitute a single body.

Unexplained reference numbers 19a and 19b indicate polarizers that are attached at front and rear surfaces of the liquid crystal panel 10 and control the polarization of light. The backlight unit 20 may include a cold cathode fluorescent lamp (CCFL), an external electrode fluorescent lamp (EEFL), and a light emitting diode (LED) as a light source. Among these light sources, the LED has been widely used due to its small size, low power consumption, and high reliability. In FIG. 1, LEDs 29a are mounted on an LED printed circuit board (PCB) 29b to form an LED assembly 29. The LED assembly 29 may be fixed by an adhesive such that light emitted from the LEDs 29a faces a side surface of the light guide plate 23 on which the light is projected. Therefore, light emitted from the LEDs 29a is projected on the side surface of the light guide plate 23 and then is refracted toward the liquid crystal panel 10 inside the light guide plate 23. With light reflected by the reflection plate 25, the light is changed to have uniform brightness and high qualities while passing through the plurality of optical sheets 21 and is provided to the liquid crystal panel 10.

An LED driving circuit (not shown) provides the LEDs 29a with driving voltages and controls on or off of the LEDs 29a. The LED driving circuit is disposed close to a rear surface of the bottom cover 50 to minimize a total size of the LCD device.

To electrically connect the LEDs 29a the LED driving circuit, a flexible cable (not shown) such as a flexible printed circuit (FPC) is disposed at a side of the LED PCB 29b to bend and connect the LED PCB 29b to the LED driving circuit on the rear surface of the bottom cover 50. The LED PCB 29b and the flexible cable are electrically connected to each other by soldering.

However, the backlight unit 20 having the above-mentioned structure has several problems. First, connection between the flexible cable and the LED PCB 29b is fragile. When the flexible cable is bent for connection to the LED driving circuit (on the rear surface of the bottom cover 50), disconnections of the flexible cable frequently occur, especially when an outer force is applied to a soldering area for connecting the flexible cable and the LED PCB 29b. This may cause malfunction of the LEDs 29a or damage to driving parts. In addition, there may be soldering problems such as cold solder or insufficient solder between the LED PCB 29b and the flexible cable, which may also cause malfunction of the LEDs 29a or damage the driving parts. Accordingly, the reliability of the LCD device is lowered due to weak connection of the flexible cable and the LED PCB 29b.

SUMMARY OF THE INVENTION

Embodiments relate to a liquid crystal display (LCD) device including a flexible printed circuit board (FPCB) where a first portion for mounting a plurality of light emitting diodes (LEDs) is integrated into a single body with a second portion that extends from the first portion and is bent to electrically connect the FPCB to a circuit for operating the plurality of LEDs. By integrating the first portion and the second portion, disconnection between the FPCB and the circuit is unlikely to occur, increasing the reliability of the LCD device and preventing damages to circuit components of the LCD device.

In one or more embodiment, the LCD device may further include a light guide plate having a plurality of side surfaces, a rear surface and a front surface, wherein light entering through one of the side surfaces are emitted via the front surface. The light is generated by the plurality of LEDs mounted on the first portion. The LCD device may also include a metallic plate secured to another surface of the first portion for providing rigidity to the first portion and transferring heat away from the FPCB.

In one or more embodiment, the LCD device further includes a reflective plate, one or more optical sheets, and a liquid crystal panel. The reflective plate is placed at the rear surface of the light guide plate to reflect back the light emitted through the rear surface of the light guide plate. The one or more optical sheets on the front surface of the light guide plate to diffuse or concentrate light emitted from the front surface of the light guide plate. The liquid crystal panel generates images based on the light passing through the one or more optical sheets.

In one or more embodiments, the LCD device includes a bottom cover having a bottom wall and at least one side wall. The bottom wall at least partly covers a rear surface of the reflective plate and is formed with a hole through which the second portion of the FPCB passes to connect to the circuit. The first portion of the FPCB is supported by the at least one side wall.

In one or more embodiments, the LCD device includes a support frame between the one or more optical sheets and the light guide plate.

In one or more embodiments, the first portion is bar shaped and extends in a lengthwise direction of the light guide plate. The second portion extends in a direction perpendicular to the lengthwise direction of the light guide place.

In one or more embodiments, the FPCB includes a flexible base film providing support and strength to the FPCB, an electric source line layer on the flexible base film, and a cover layer on the electric source line layer for protecting the electric source line layer. The source line layer includes a pattern of conductive material to transmit electric signals.

In one or more embodiments, the plurality of LEDs are mounted on the first portion using a surface mount technology (SMT).

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to embodiments of the present invention, examples of which are illustrated in the accompanying drawings.

Figure 2:
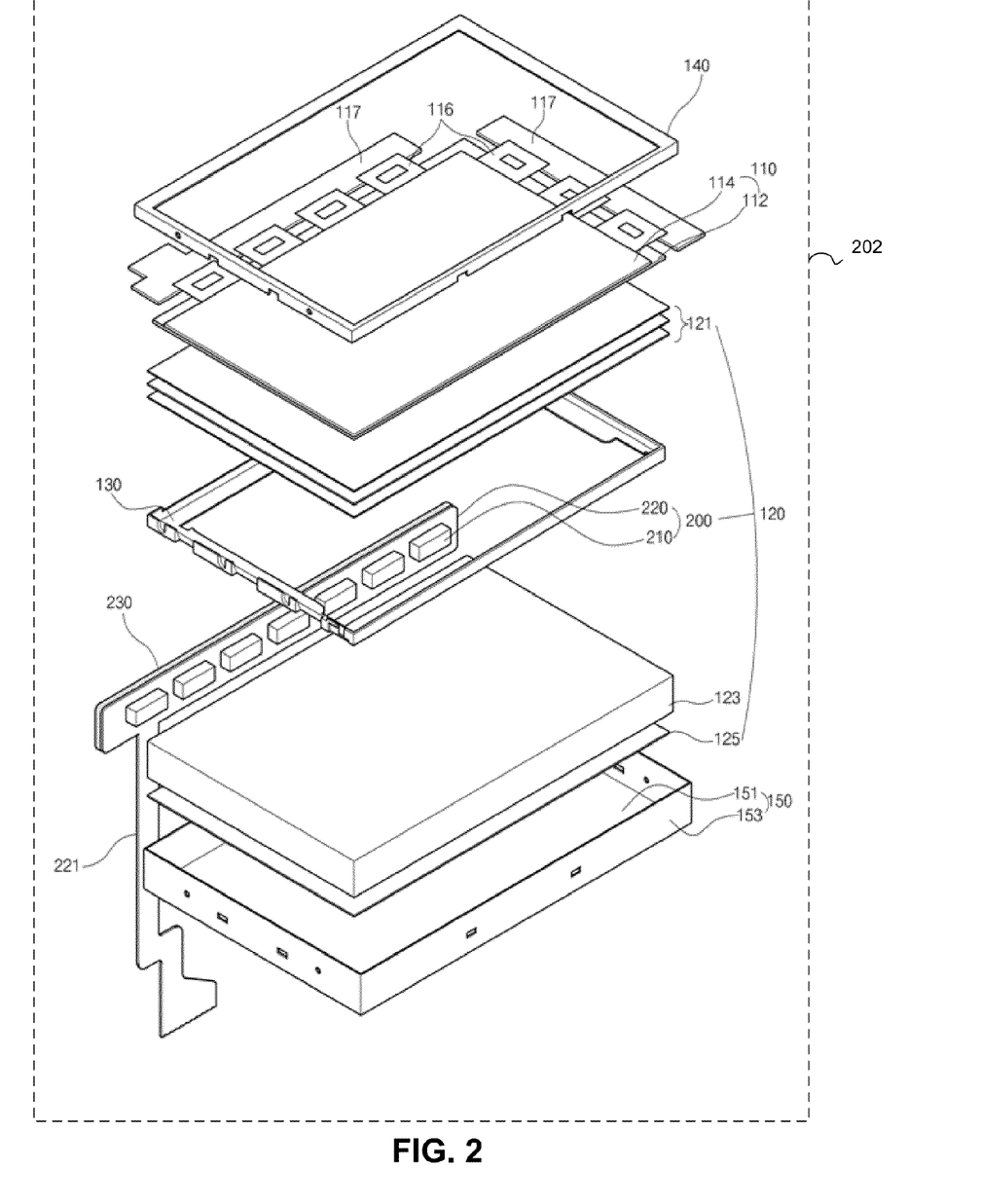
FIG. 2 is an exploded perspective view of illustrating an LCD device according to an exemplary embodiment.

FIG. 2 is an exploded perspective view illustrating an LCD device 202 according to an example embodiment. In FIG. 2, the LCD device 202 includes a liquid crystal panel 110, a backlight unit 120, a support frame 130, a top cover 140 and a bottom cover 150.

More particularly, the liquid crystal panel 110 displays images. The liquid crystal panel 110 includes first and second substrates 112 and 114 facing and attached to each other with a liquid crystal layer placed between the first and second substrates 112 and 114. In an active matrix-type (although not shown in the figures), gate lines and data lines are formed on an inner surface of the first substrate 112. The first substrate 112 may also be referred to as a lower substrate or an array substrate. The gate lines and the data lines intersect to define pixel regions.

A thin film transistor (TFT) is formed at each crossing point of the gate and data lines, and a pixel electrode is connected to the thin film transistor at each pixel region. The pixel electrode may be formed of a transparent conductive material.

A black matrix and red, green and blue color filter patterns are formed on an inner surface of the second substrate 114. The second substrate may be referred to as an upper substrate or a color filter substrate. The color filter patterns correspond to the pixel regions, respectively. The black matrix surrounds each of the color filter patterns and covers the gate lines, the data lines, and/or the thin film transistors. A transparent common electrode is formed over the color filter patterns and the black matrix.

Polarizers (not shown) are attached to outer surfaces of the first and second substrates 112 and 114 and selectively transmit linearly polarized light.

A printed circuit board 117 is attached to at least a side of the liquid crystal panel 110 via connecting means 116 such as flexible printed circuit boards or tape carrier packages (TCPs), for example. The printed circuit board 117 is bent toward a side surface of the support frame 130 or a rear surface of the bottom cover 150 during a module assembly process.

In the liquid crystal panel 110, on/off signals from gate driving circuits are provided to the thin film transistors through the gate lines. When the thin film transistors selected by each gate line are turned on, data signals from data driving circuits are provided to the pixel electrodes through the data line. As a result, an electric field is induced between the pixel electrodes and the common electrode, and the arrangement of the liquid crystal molecules is changed by the electric field to change transmittance of light. Therefore, the liquid crystal panel 110 displays variances in the transmittance as images.

The backlight unit 120 is disposed under the liquid crystal panel 110 and provides light to the liquid crystal panel 110 so that the variances in the transmittance of the liquid crystal panel 110 are visible from the outside.

The backlight unit 120 includes a light-emitting diode (LED) assembly 200, a reflection plate 125 of a white or silver color, a light guide plate 123 over the reflection plate 125, and optical sheets 121 over the light guide plate 123.

The LED assembly 200 is disposed at a side of the light guide plate 123 such that the LED assembly 200 faces a side surface of the light guide plate 123 onto which the light is projected. The LED assembly 200 includes a plurality of LEDs 210 and an LED flexible printed circuit board (FPCB). The LED FPCB includes a FPCB bar 220 and a leg portion 221. The LEDs 210 are mounted spaced away from each other on the FPCB bar 220.

Embodiments provide the LED assembly 200 where the LEDs 210 are mounted on the FPCB bar 220 that is flexible. A metallic bar 230 for increasing rigidity of the FPCB bar 220 is disposed at a rear surface of the FPCB bar 220 at the opposite side of the front surface of the LED FPCB where the LEDs 210 are mounted.

The LCD device 202 further includes an LED driving circuit 160 (shown in FIG. 4B) for controlling on/off of the LED assembly 200. The LED driving circuit 160 is disposed on the bottom wall 151 of the bottom cover 150 to minimize a total size of the LCD device.

The LED FPCB includes a leg portion 221 and a FPCB bar 220. The leg portion 221 of the LED FPCB extends from the FPCB bar 220 to electrically connect the LED PFCB to the LED driving circuit 160 disposed on the bottom wall 151 of the bottom cover 150. The leg portion 221 and the FPCB bar 220 are flexible and can be bent. The leg portion 221 can be connected to the LED driving circuit 160 on the bottom wall 151 the bottom cover 150 by bending the leg portion 221. That is, in the LCD device 202, the LEDs 210 of the LED assembly 200 are mounted on the FPCB bar 220 that is connected to the LED driving circuit on the bottom wall 151 of the bottom cover 150 by directly extending the leg portion 221 to the LED driving circuit 160.

Directly extending the leg portion 221 to the LED driver circuit 160 is advantageous, among other reasons, because disconnection between the LED driving circuit and the FPCB bar 220 can be prevented, and malfunction of the LEDs 210 and damage to circuit components can be prevented, as described below in more detail.

The light emitted from the LEDs 210 of the LED assembly 200 is projected into the light guide plate 123. Total internal reflection of the light occurs several times in the light guide plate 123 as the light moves through the inside of the light guide plate 123 and is widely and uniformly scattered. In this way, the light guide plate 123 functions as a plane light source for lighting the liquid crystal panel 110.

To provide a plane light source, the light guide plate 123 may include predetermined patterns at its rear surface. The patterns may be elliptical, polygonal or holographic so as to guide the light projected inside of the light guide plate 123. The patterns may be formed by a printing method or an injecting method.

The reflection plate 125 is disposed under the rear surface of the light guide plate 123. The reflection plate 125 reflects light passing through the rear surface of the light guide plate 123 toward the liquid crystal panel 110 to increase the brightness.

The optical sheets 121 over the light guide plate 123 include a diffuser sheet and at least a light-concentrating sheet. The optical sheets 121 diffuse or concentrate light passing through the light guide plate 123 to function as a plane light source that provides more uniform light over the entire liquid crystal panel 110.

The liquid crystal panel 110 and the backlight unit 120 are modularized with the top cover 140, the support frame 130 and the bottom cover 150. The top cover 140 has a rectangular frame shape with an L-shaped cross-section to cover edges of a front surface and side surfaces of the liquid crystal panel 110. A front surface of the top cover 140 has an opening. Images generated on the liquid crystal panel 110 are displayed through the opening.

The liquid crystal panel 110 and the backlight unit 120 are disposed over the bottom cover 150. The bottom cover 150 is a base for assembling the LCD device. The bottom cover 150 includes a bottom wall 151 close to the reflection plate 125 of the backlight unit 120 and side walls 153 bent toward the liquid crystal panel 110 from the edges of the bottom plane 151.

The support frame 130 has a rectangular shape. The support frame 130 is disposed over the bottom cover 150 and surrounds the edges of the liquid crystal panel 110 and the backlight unit 120. The support frame 130 is combined with the top cover 140 and the bottom cover 150.

The top cover 140 may also be referred to as a case top or a top case. The support frame 130 may also be referred to as a guide panel, a main support or a mold frame. The bottom cover 150 may also be referred to as a bottom cover or a lower cover.

The backlight unit 120 having the above-mentioned structure may be referred to as a side light type. The LEDs 210 may be arranged on the FPCB bar 220 in several rows according to purposes. Furthermore, one or more LED assemblies 200 may be disposed at each of the side walls of the bottom cover 150 facing each other and may correspond to each other.

In the LCD device, the FPCB bar 220 of the LED assembly 200 is directly connected to the LED driving circuit 160. By providing a secure connection, disconnection between the LED driving circuit and the LED FPCB, and malfunction of the LEDs 210 are prevented.

Figure 3A:
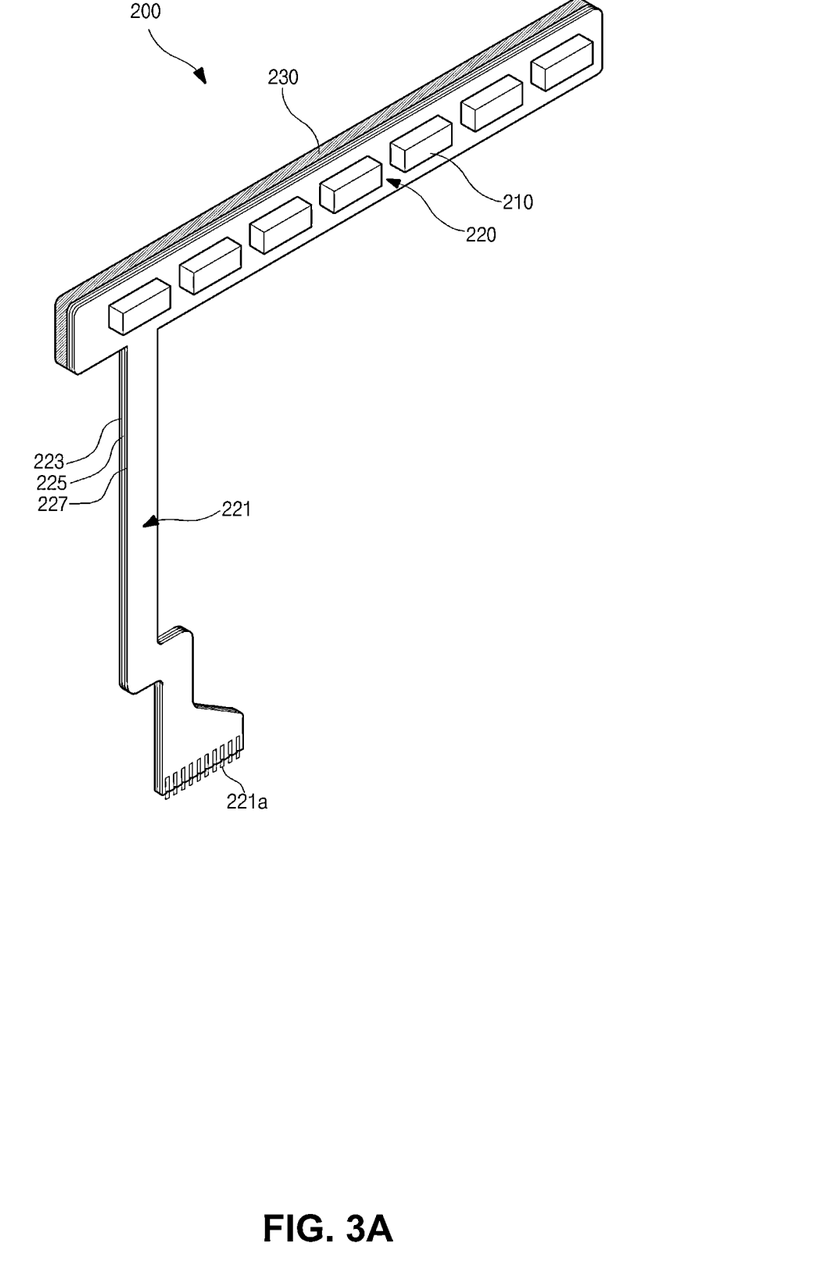
FIGS. 3A and 3B are perspective views illustrating an LED assembly according to the exemplary embodiment of FIG. 1.
Figure 3B:
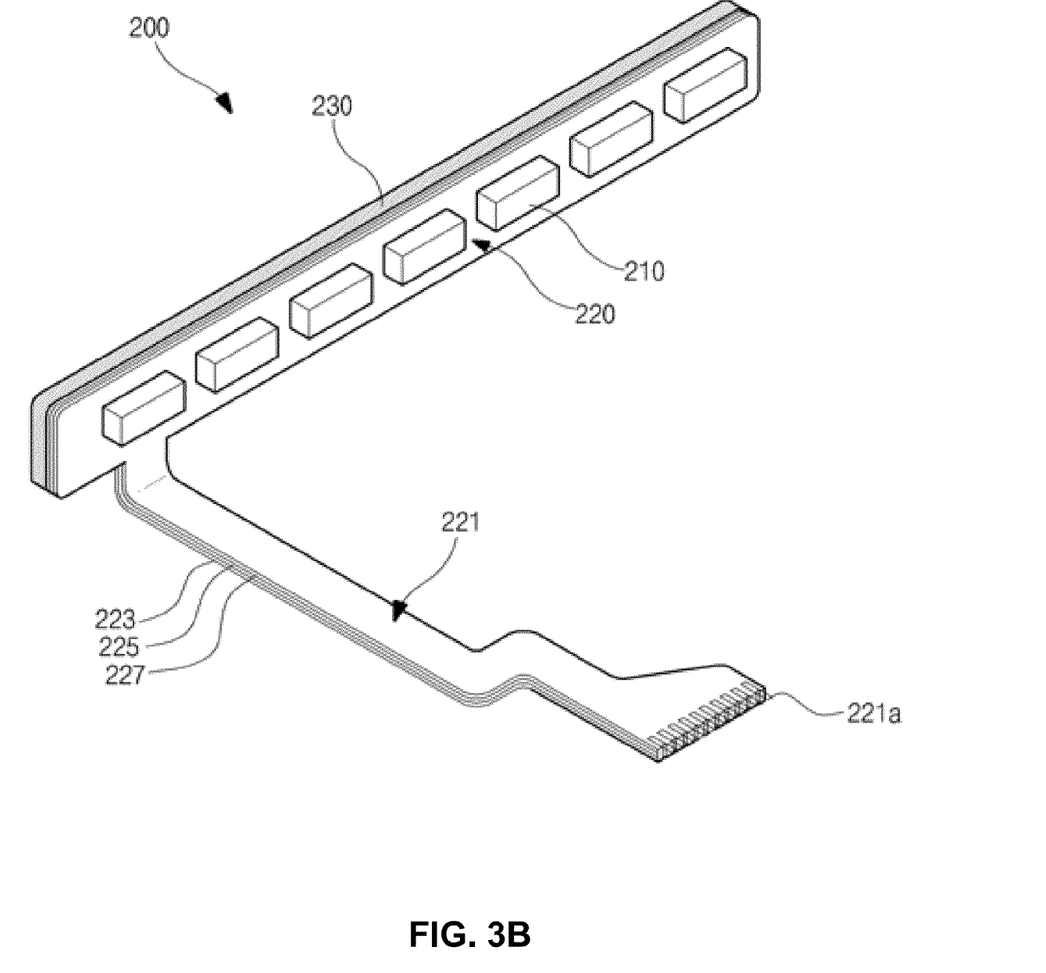

FIGS. 3A and 3B are perspective views illustrating an LED assembly 200 according to the exemplary embodiment. The LED assembly 200 includes LEDs 210 and an LED FPCB. The LEDs 210 may be mounted on the FPCB bar 220 by a surface mount technology (SMT) and may be spaced apart from each other with a predetermined interval. The FPCB bar 220 has a long bar shape. The LEDs 210 are disposed on the FPCB bar 220 in a lengthwise direction of the FPCB bar 220.

The LEDs 210 are connected in parallel and are provided with voltage signals through metallic lines (not shown) formed on the LED FPCB. The LEDs 210 may include red (R), green (G) and blue (B) LEDs, which emit red, green and blue light, respectively. White light may be produced by lighting the RGB LEDs 210 simultaneously and by mixing the red, green and blue light. Each of the LEDs 210 may include LED chips respectively emitting red, green and blue light, and each LED 210 may produce white light. The LED 210 may include a chip emitting white light and emit full white light.

The LED FPCB includes a flexible base film 223 and an electric source line layer 225 on the base film 223. The electric source line layer 225 comprises a plurality of metal lines that are formed by patterning a conductive material. The base film 223 supports the electric source line layer 225 and the LEDs 210. The base film 223 may be formed of a resin such as polyimide or polyester. The base film 223 may be formed of a material having relatively thermal conductivity such as flame resistant 4 (FR4) or T-preg. The metal lines (not shown) of the electric source line layer 225 provide on/off signals to the LEDs 210 on the FPCB bar. The metal lines do not overlap with each other.

A cover layer 227 is further formed on the electric source line layer 225 to protect the electric source line layer 225. The cover layer 227 may be formed of an organic or inorganic insulating material. The cover layer 227 may include a white material to reflect light. The cover layer 227 may have a reflection function as well as an insulation function. That is, since the cover layer 227 is formed of a white material having relatively high reflectance, the cover layer 227 reflects some of light propagated in an area between adjacent LEDs 210 such that the reflected light enters the interior of the light guide plate 123 when the light emitted from the LEDs 210 is projected on the light guide plate 123 of FIG. 2. By using the reflected light, a hot spot problem (i.e., areas between the adjacent LEDs 210 being relative to other areas of the light guide plate 123) can be resolved or reduced. In addition, the amount of light projected into the light guide plate 123 of FIG. 2 is increased, which results in increase of the light efficiency. The cover layer 227 may be formed by a photo solder resist (PSR) process.

Moreover, as stated above, the metallic bar 230 is further disposed at the rear surface of the FPCB bar 220 opposite to the front surface of the FPCB bar 220 on which the LEDs 210 are mounted. The base film 210 insulates the metallic bar 230 and the electric source line layer 225. The metallic bar 230 increases the rigidity of the FPCB bar 220 and while radiating the heat of the LED assembly 200. The metallic bar 230 may be formed of a metal material having relatively high thermal conductivity such as aluminum (Al) or copper (Cu).

In one embodiment, the base film 223 has a first stiffness ($k_1$), the electric source line layer 225 has a second stiffness ($k_2$) and the cover layer 227 has a third stiffness ($k_3$), wherein the third stiffness is the greatest followed by the second stiffness and the first stiffness. The first stiffness is the lowest. When the leg portion 221 is bent upward (as shown in FIG. 3A), the base film 223 experiences the highest strain followed by the electric source line layer 225 and the cover layer 227.

The heat generated by the LEDs 210 is effectively transferred outside of the LCD device 202 by heat conduction of the metallic bar 230. To increase the heat transfer, the metallic bar 230 contacts the side wall 153 of the bottom cover 150 to transfer the heat generated by the LEDs 210 to the bottom cover 150. Since the bottom cover 150 of FIG. 2 has a relatively large area exposed to the external air compared with the metallic bar 230, the bottom cover 150 effectively transfers heat generated by the LEDs 210 outside the LCD device 202. To increase heat transfer, a heat sink (not shown) may be further disposed between the metallic bar 230 and the bottom cover 150 of FIG. 2. The heat sink may be provided with adhesive and has a high heat-transfer property. Using the adhesive on the heat sink, the LED assembly 200 may be attached to the side wall 153 of the bottom cover 150 while promptly and effectively transferring the heat away from the LEDs 210.

The LED FPCB also includes the leg portion 221 extending from the FPCB bar 220. The leg portion 221 and the FPCB bar 220 of LED FPCB are integrated into a single body. One end of the leg portion 221 is electrically connected to the LED driving circuit 160 disposed at the bottom wall 151 of the bottom cover 150 (see FIG. 4B).

The leg portion 221 also includes the flexible base film 223, the electric source line layer 225, and the cover layer 227 covering the electric source line layer 225. The electric source line layer 225 comprises metal lines that are formed by patterning a conductive material on the base film 223.

A pad portion 221a is disposed at the one end of the leg portion 221 for electrically connecting the LED driving circuit 160.

The leg portion 221 is also as flexible as the FPCB bar 220. Thus, as shown in FIG. 3B, the leg portion 221 can be bent. In the LED assembly 200 according to the embodiment, the leg portion 221 for connecting the LED assembly 200 with the LED driving circuit on the rear surface of the bottom cover 150 of FIG. 2 is integrated into a single body with the FPCB bar 220 where the LEDs 210 are mounted. Since the leg portion 221 extends from the FPCB bar 220, disconnection between the LED driving circuit 160 and the FPCB bar 220 is unlikely to occur despite bending the leg portion 221, decreasing the chance of malfunction of the LEDs 210 and damage to the circuit part.

Contrast this with the conventional LED assembly 29 of FIG. 1 where the LED assembly 29 of FIG. 1 and the LED driving circuit (on the rear surface of the bottom cover 50 of FIG. 1) are connected by the flexible cable connected to the side of the PCB 29b of FIG. 1 by soldering. When the flexible cable is bent, the outer force is applied to the soldering area for connecting the flexible cable and the PCB 29b of FIG. 1, causing disconnections of the flexible cable to occur frequently.

Figure 4A:
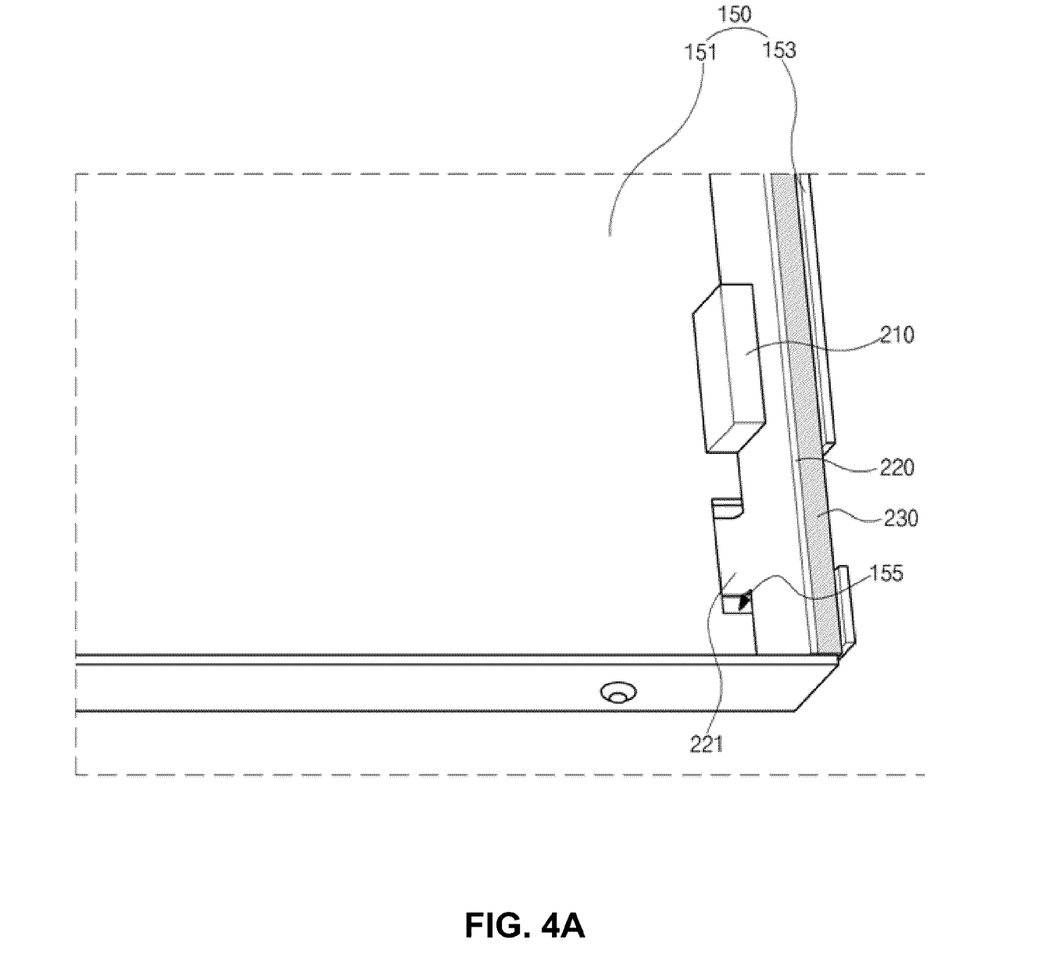
FIGS. 4A and 4B are perspective views illustrating connection of the cable flexible printed circuit board (FPCB) of the LED assembly and the LED driving circuit on the rear surface of the bottom cover according to the exemplary embodiment.
Figure 4B:
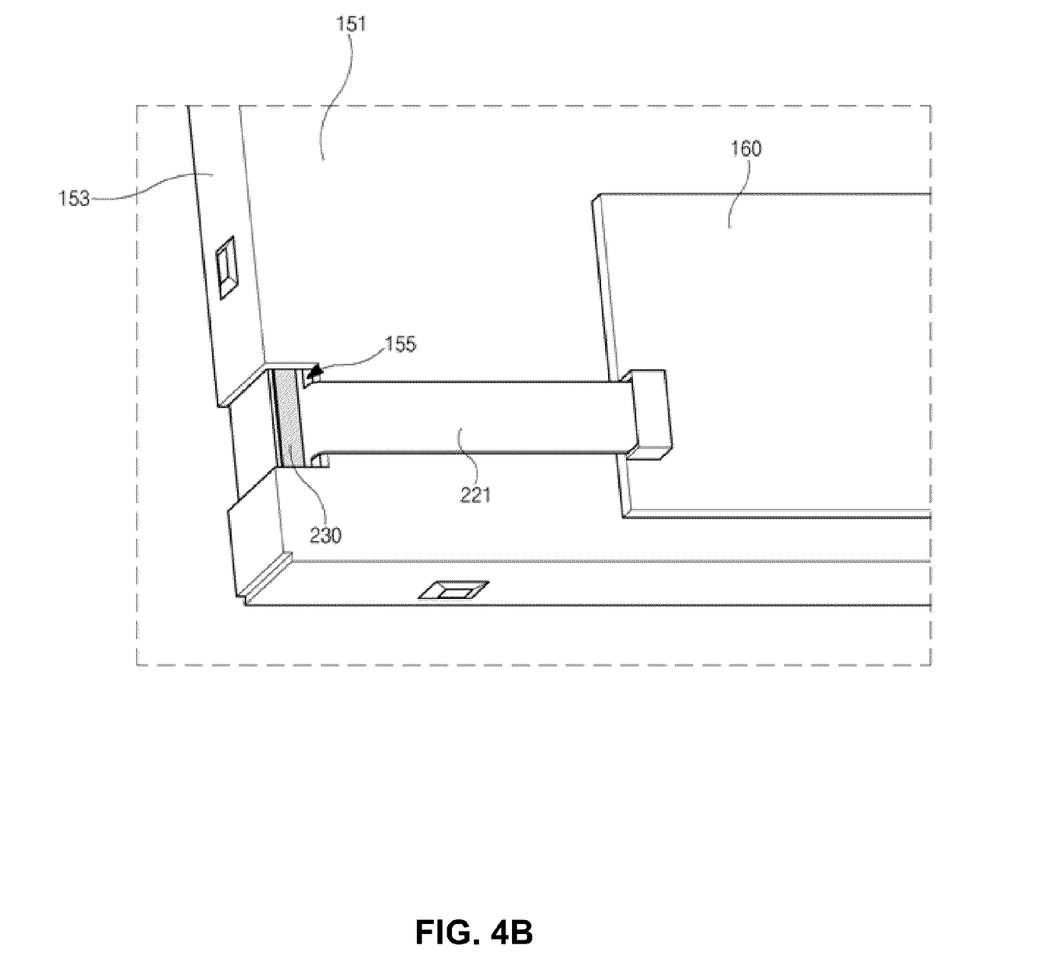

FIGS. 4A and 4B are perspective views of illustrating connection of the leg portion 221 of the LED assembly 200 and the LED driving circuit 160 on the bottom wall 151 of the bottom cover 150 according to an example embodiment. FIG. 4B shows the bottom wall 151 of the bottom cover 150. In FIGS. 4A and 4B, the LED assembly 200 including the LEDs 210 mounted on the FPCB bar 220 is attached and fixed to an inner surface of one side wall 153 of the bottom cover 150. Although not shown in the figures, the reflection plate 125 of FIG. 2 is disposed over the bottom wall 151 of the bottom cover, and the light guide plate 123 of FIG. 2 is disposed over the reflection plate 125 of FIG. 2 such that a side surface of the light guide plate 123 of FIG. 2 on which light is projected faces the direction of the light emitted from the LEDs 210.

The LED assembly 200 is attached and fixed such that the metallic bar 230 on the rear surface of the FPCB bar 220 contacts the inner surface of the side wall 153 of the bottom cover 150.

The leg portion 221 extending from the FPCB bar 220 is bent substantially at an angle of 90 degrees with respect to the FPCB bar 220 and is disposed on the rear surface of the bottom cover 150 through a withdrawal hole 155 formed in the bottom wall 151 of the bottom cover 150. In this way, the leg portion 221 is electrically connected to the LED driving circuit 160 disposed on the rear surface of the bottom cover 150.

In the LED assembly 220, the FPCB bar 220 and the leg portion 221 are integrated into a single body. Even though the leg portion 221 is bent perpendicularly to the FPCB bar 220, disconnection between the FPCB bar 220 and the leg portion 221 is unlikely to occur.

Although the above embodiments were described with respect to the LED assembly used for projecting the light into a light guide plate via a side surface of the light guide plate, other embodiments may employ an LED assembly to project the light from a rear surface of a transparent plate.

Moreover, the LED assembly 200 of the example embodiment does not suffer from soldering problems such as cold solder or insufficient solder. Since the LED assembly 200 of the present invention does not require a soldering area, the LED assembly 200 of the present invention may be thinner than the conventional LED assembly. Therefore, the reliability of the LCD device can be improved when the LED assembly 200 of the example embodiment is used.

Among other advantages, the LED assembly 200 according to the example embodiment are less likely to suffer disconnection from the LED driving circuit 160, and less likely to experience malfunction of the LEDs 210 or damages to the circuit part. Further, the metallic bar 230 is formed on the rear surface of the FPCB bar 220 to increase the rigidity of the FPCB bar 220 and to radiate the heat of the LED assembly 200. Thus, the heat generated by the LEDs 210 is effectively sent out to the outside of the LCD device.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:
1. A liquid crystal display (LCD) device, comprising:
a light guide plate having a plurality of side surfaces, a rear surface substantially perpendicular to the plurality of side surfaces, and a front surface closer to a liquid crystal panel than a bottom cover and perpendicular to the plu- rality of side surfaces, wherein light entering through one of the side surfaces are emitted via the front surface;

a flexible printed circuit board (FPCB) comprising:
   a first portion having a first flat surface substantially parallel to and facing the one of the side surfaces of the light guide plate, a plurality of light emitting diodes (LEDs) mounted on the first flat surface alongside the one of the side surfaces of the light guide plate to face and emit the light onto the one of the side surfaces of the light guide plate, and
   a second portion extending from the first portion and integrated with the first portion into a single body, the second portion having a second flat surface that is bent substantially perpendicular to the first flat surface to electrically connect the FPCB to a circuit for operating the plurality of LEDs;
   each of the first portion and the second portion comprising a flexible base film of electrically insulating material, an electric source line layer on the flexible base film, and a cover layer on the electric source line layer for protecting the electric source line layer, the electric source line layer comprising a pattern of conductive material to transmit electric signals, the plurality of LEDs secured to the cover layer of the first portion; and a metallic plate secured directly to the flexible base film of the first portion for providing rigidity to the first portion and transferring heat away from the FPCB.

2. The LCD device of claim 1, further comprising:
a reflective plate placed at the rear surface of the light guide plate to reflect back the light emitted through the rear surface of the light guide plate;
one or more optical sheets on the front surface of the light guide plate to diffuse or concentrate light emitted from the front surface of the light guide plate; and
a liquid crystal panel on the one or more optical sheets, the liquid crystal panel configured to generate images based on the light passing through the one or more optical sheets.

3. The LCD device of claim 2, further comprising a bottom cover having a bottom wall and at least one side wall, the bottom wall at least partly covering a rear surface of the reflective plate and formed with a hole through which the second portion of the FPCB passes to connect to the circuit, the first portion of the FPCB supported by the at least one side wall.

4. The LCD device of claim 2, further comprising a support frame between the one or more optical sheets and the light guide plate.

5. The LCD device of claim 1, wherein the first portion is bar shaped and extends in a lengthwise direction of the light guide plate, and wherein the second portion extends in a direction perpendicular to the lengthwise direction of the light guide place.

6. The LCD device of claim 1, wherein the flexible base film has a first stiffness, the electric source line layer has a second stiffness greater than the first stiffness, and the cover layer has a third stiffness greater than the second stiffness.

7. The LCD device of claim 1, wherein the cover layer includes a white material to reflect the light incident on the cover layer.

8. The LCD device of claim 1, wherein the metallic plate is made from aluminum (Al) or copper (Cu).

9. The LCD device of claim 1, wherein the metallic plate and the first portion are bar shaped.

10. The LCD device of claim 1, wherein the plurality of LEDs are mounted on the first portion using a surface mount technology (SMT).

11. A flexible printed circuit board (FPCB) in a display device, comprising:
   a first portion having a flat surface substantially parallel to and facing one of the side surfaces of a light guide plate, the light guide plate having the side surfaces, a rear surface substantially perpendicular to the side surfaces, and a front surface closer to a liquid crystal panel than a bottom cover and perpendicular to the side surfaces, the one of the side surfaces perpendicular to a front surface through which light is emitted from the light guide plate, a plurality of light emitting diodes (LEDs) mounted on the flat surface alongside the one of the side surfaces of the light guide plate to face and emit the light onto the one of the side surfaces of the light guide plate; and
   a second portion extending from the first portion and integrated with the first portion into a single body, the second portion having a second flat surface that is bent substantially perpendicular to the first flat surface to electrically connect the FPCB to a circuit for operating the plurality of LEDs,
   each of the first portion and the second portion comprising a flexible base film of electrically insulating material for directly securing a metallic plate at the first portion, an electric source line layer on the flexible base film, and a cover layer on the electric source line layer for protecting the electric source line layer, the electric source line layer comprising a pattern of conductive material to transmit electric signals, the plurality of LEDs secured to the cover layer of the first portion.

12. The FPCB of claim 11, wherein the first portion is bar shaped and extends in a lengthwise direction of a light guide plate, and wherein the second portion extends in a direction perpendicular to the lengthwise direction of the light guide place.

13. The FPCB of claim 11, wherein the flexible base film has a first stiffness, the electric source line layer has a second stiffness greater than the first stiffness, and the cover layer has a third stiffness greater than the second stiffness.

14. The FPCB of claim 11, wherein the cover layer includes a white material to reflect light incident on the cover layer.

15. The FPCB of claim 11, wherein the first portion is configured to secure a metallic plate for providing rigidity to the first portion and transferring heat away from the FPCB.

16. The FPCB of claim 13, wherein the metallic plate is made from aluminum (Al) or copper (Cu).

17. The FPCB of claim 11, wherein the plurality of LEDs are mounted on the first portion using a surface mount technology (SMT).

* * * * *